Patented Oct. 20, 1931

1,828,599

UNITED STATES PATENT OFFICE

GUILLAUME DE MONTMOLLIN, OF BASEL, AND MAX SCHMID, OF RIEHEN, NEAR BASEL, SWITZERLAND, ASSIGNORS TO SOCIETY OF CHEMICAL INDUSTRY IN BASLE, OF BASEL, SWITZERLAND

AZO-DYESTUFFS OF THE PYRAZOLONE SERIES AND PROCESS OF MAKING SAME

No Drawing. Application filed December 16, 1927, Serial No. 240,617, and in Switzerland December 24, 1926.

It has been found that valuable dyestuffs are obtained by coupling aromatic unsulfonated diazonium compounds, which contain beside the diazo-group at least one substituent in the aryl nucleus, with 3-methyl-5-pyrazolone. The dyestuffs thus obtained correspond to the general formula:

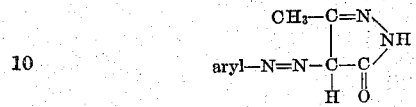

in which the aryl nucleus contains at least one substituent. Quite a number of these dyestuffs are characterized by a surprisingly excellent affinity for acetyl-cellulose or cellulose esters and ethers and dye these materials yellow to orange-red non-phototrop tints. Especially fast to light are those dyestuffs, which derive from o-nitrodiazo-compounds, such as the diazo-compounds of o-nitraniline, 4-chloro-2-nitraniline, 4-alkoxy-2-nitraniline, and the like. Due to the solubility of the new dyestuffs in alcohol and the various organic liquids the products may also be employed for the manufacture of dyed lacquers of artificial or natural origin which, according to the diazotizing component used, are dyed in green-yellow to red-orange and violet tints. When dry the new dyestuffs form powders the color of which, according to the composition, may be yellow, orange, red or violet. They are insoluble in water, but soluble in alcohol with yellow, orange, red or violet coloration.

Example 1

A diazo-solution obtained in the usual manner from 15.2 parts of 4-amino-3-nitro-1-methyl-benzene is poured into a solution of 10 parts of 3-methyl-5-pyrazolone to which 30 parts of crystallized sodium acetate have been added. The dyestuff which is immediately precipitated is filtered by suction and washed. When dry it forms a yellow powder which is insoluble in water, but soluble in alcohol with yellow coloration. In aqueous suspension it dyes acetate silk yellow tints very fast to light. This dyestuff dyes also lacquers in yellow tints very fast to light. The formula of the new product is very probably:

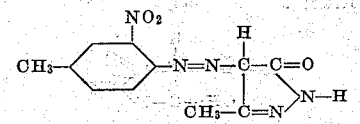

Example 2

A diazo-solution obtained in the usual manner from 19.7 parts of amino-azo-benzene is poured into a solution of 10 parts of 3-methyl-5-pyrazolone to which 30 parts of crystallized sodium acetate have been added. The dyestuff which is immediately precipitated is filtered by suction and washed. When dry it forms an orange powder which is insoluble in water, but soluble in alcohol with orange coloration. It dyes acetyl cellulose in orange-yellow tints and may be used for the manufacture of orange colored Zapon lacquers which are fast to light. The formula of the new product is very probably:

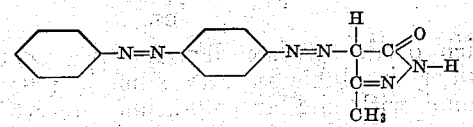

What we claim is:—

1. Process for the manufacture of new azo-dyestuffs, consisting in coupling such aromatic, unsulphonated diazo-compounds of the benzene series, which contain in the aryl nucleus in o-position to the diazo-group a nitro-group, with 3-methyl-5-pyrazolone.

2. Process for the manufacture of new azo-dyestuffs, consisting in coupling such aromatic, unsulphonated diazo-compounds of the benzene series, which contain in the aryl nucleus besides the nitro-group in ortho position to the diazo-group a substituent in 4-position to the diazo-group, with 3-methyl-5-pyrazolone.

3. Process for the manufacture of new azo-dyestuffs, consisting in coupling diazotized 4-amino-3-nitro-1-methylbenzene with 3-methyl-5-pyrazolone.

4. As new products the azo-dyestuffs of the pyrazolone series corresponding with the general formula:

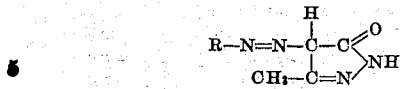

wherein R is an aromatic unsulfonated nucleus of the benzene series, which contains in the o-position to the diazo-group a nitro group, which products, when dry, form yellow powders, insoluble in water, but soluble in alcohol with similar coloration, and which dye acetyl cellulose and lacquers also similar tints which are very fast, especially very fast to light.

5. As new products the azo-dyestuffs of the pyrazolone series corresponding with the general formula:

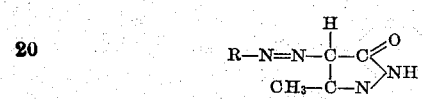

wherein R is an aromatic unsulfonated nucleus of the benzene series, which contains besides the nitro-group in ortho-position to the diazo-group a substituent in the 4-position to the diazo-group, which products, when dry, form yellow powders, insoluble in water, but soluble in alcohol with similar coloration, and which dye acetyl cellulose and lacquers also similar tints which are very fast, especially very fast to light.

6. As a new product, the azo-dyestuff of the pyrazolone series corresponding with the formula:

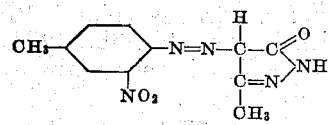

which product, when dry, forms a yellow powder, insoluble in water, but soluble in alcohol with similar coloration and which dyes acetyl cellulose and lacquers also a similar tint, which is very fast, especially very fast to light.

In witness whereof we have hereunto signed our names this 3rd day of December 1927.

GUILLAUME de MONTMOLLIN.
MAX SCHMID.